United States Patent
Pathak

(10) Patent No.: US 11,948,251 B2
(45) Date of Patent: Apr. 2, 2024

(54) THROTTLING HULL SHADERS BASED ON TESSELLATION FACTORS IN A GRAPHICS PIPELINE

(71) Applicant: ADVANCED MICRO DEVICES, INC., Santa Clara, CA (US)

(72) Inventor: Nishank Pathak, Orlando, FL (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 17/974,199

(22) Filed: Oct. 26, 2022

(65) Prior Publication Data

US 2023/0169728 A1    Jun. 1, 2023

Related U.S. Application Data

(63) Continuation of application No. 17/121,965, filed on Dec. 15, 2020, now Pat. No. 11,508,124.

(51) Int. Cl.
  *G06T 17/20* (2006.01)
  *G06T 15/00* (2011.01)

(52) U.S. Cl.
  CPC ............ *G06T 17/20* (2013.01); *G06T 15/005* (2013.01)

(58) Field of Classification Search
  None
  See application file for complete search history.

(56) References Cited

U.S. PATENT DOCUMENTS 11,508,124 B2 * 11/2022 Pathak ............... G06T 15/005

OTHER PUBLICATIONS

Final Office Action issued in U.S. Appl. No. 17/123,978, dated Jan. 26, 2023, 22 pages.
Notice of Allowance issued in U.S. Appl. No. 17/123,978 dated May 25, 2023, 9 pages.
International Preliminary Report on Patentability dated Jun. 29, 2023 for PCT/US2021/061387, 5 pages.
International Preliminary Report on Patentability dated Jun. 29, 2023 for PCT/US2021/063251, 6 pages.
Notice of Allowance issued in U.S. Appl. No. 17/217,050, dated Mar. 9, 2023 21 pages.
International Preliminary Report on Patentability dated Oct. 13, 2023 for PCT/US2022/017156, 6 pages.

* cited by examiner

*Primary Examiner* — Sultana M Zalalee

(57) ABSTRACT

A processing system includes hull shader circuitry that launches thread groups including one or more primitives. The hull shader circuitry also generates tessellation factors that indicate subdivisions of the primitives. The processing system also includes throttling circuitry that estimates a primitive launch time interval for the domain shader based on the tessellation factors and selectively throttles launching of the thread groups from the hull shader circuitry based on the primitive launch time interval of the domain shader and a hull shader latency. In some cases, the throttling circuitry includes a first counter that is incremented in response to launching a thread group from the buffer and a second counter that modifies the first counter based on a measured latency of the domain shader.

20 Claims, 7 Drawing Sheets

THROTTLING HULL SHADERS BASED ON TESSELLATION FACTORS IN A GRAPHICS PIPELINE

CROSS-REFERENCE TO RELATED APPLICATIONS

The present application is a Continuation application of U.S. patent application Ser. No. 17/121,965, entitled "THROTTLING HULL SHADERS BASED ON TESSELLATION FACTORS IN A GRAPHICS PIPELINE", and filed on Dec. 15, 2020, now issued as U.S. Pat. No. 11,508,124, the entirety of which is incorporated by reference herein.

BACKGROUND

Graphics processing units (GPUs) implement graphics processing pipelines that concurrently process copies of commands that are retrieved from a command buffer. The graphics pipeline includes one or more shaders that execute using resources of the graphics pipeline and one or more fixed function hardware blocks. The graphics pipeline is typically divided into a geometry portion that performs geometry operations on patches or other primitives such as triangles that are formed of vertices and edges and represent portions of an image. The shaders in the geometry portion can include vertex shaders, hull shaders, domain shaders, and geometry shaders. The geometry portion of the graphics pipeline completes when the primitives produced by the geometry portion of the pipeline are rasterized (e.g., by one or more scan converters) to form sets of pixels that represent portions of the image. Subsequent processing on the pixels is referred to as pixel processing and includes operations performed by shaders such as a pixel shader executing using resources of the graphics pipeline. GPUs and other multi-threaded processing units typically implement multiple processing elements (which are also referred to as processor cores or compute units) that concurrently execute multiple instances of a single program on multiple data sets as a single wave. A hierarchical execution model is used to match the hierarchy implemented in hardware. The execution model defines a kernel of instructions that are executed by all the waves (also referred to as wavefronts, threads, streams, or work items).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
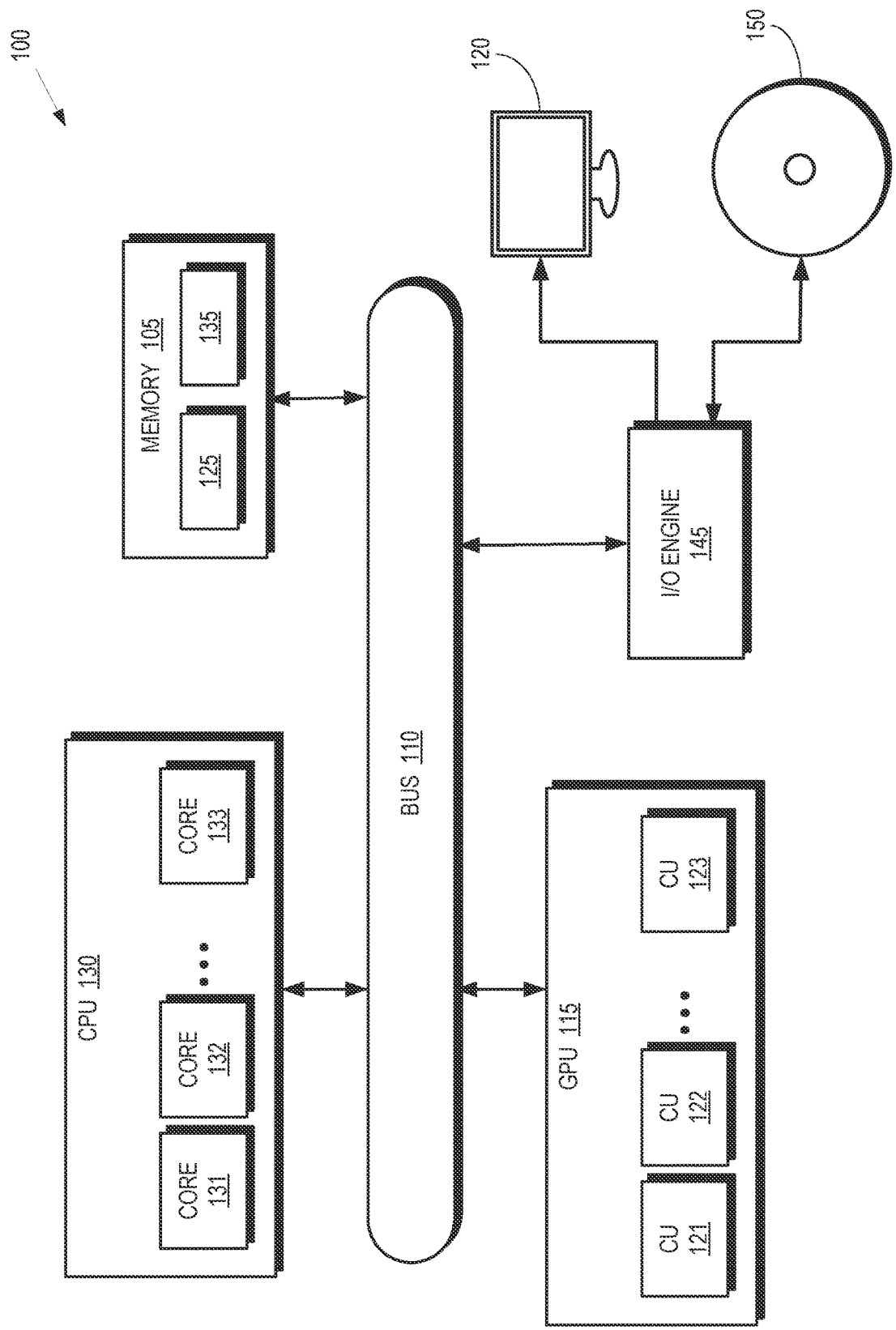
FIG. 1 is a block diagram of a processing system according to some embodiments.

A hull shader circuit in the geometry portion of the graphics pipeline launches waves of control points of patches that are processed by the hull shader. The hull shader also generates tessellation factors that indicate subdivisions of the patches. The patches processed by the hull shader and the tessellation factors are passed on to a tessellator in the graphics pipeline. The tessellator uses the tessellation factors to subdivide the patches into other primitives such as triangles prior to processing the tessellated primitives in domain shader. Thus, the domain shader typically processes a larger number of primitives than the hull shader. For example, if the tessellation factor is sixteen for a quad patch processed by the hull shader, the domain shader processes 512 triangles in response to receiving the patch from the hull shader. Patches are launched by the hull shader circuit based on a greedy algorithm that attempts to use as many of the resources of the graphics pipeline as possible. Launching hull shader waves based on a greedy algorithm can starve the domain shader of the resources needed to process the tessellated primitives. Some graphics pipelines are configured to limit the number of waves in-flight by constraining the number of compute units that can be allocated to the hull shader for processing waves. However, a static limit on the number of available compute units reduces performance of the graphics pipeline when there is little or no amplification of the primitives launched by the hull shader, e.g., when the tessellation factors are small or equal to one.

FIGS. 1-7 disclose systems and techniques that maintain a balance between graphics pipeline resources consumed by a first shader of a first type and a second shader of a second type by selectively launching waves from the first shader based on measures of the graphics pipeline resources consumed by the first shader and the second shader. In some embodiments, the first shader is a hull shader and the second shader is a domain shader that receives primitives from a tessellator. The hull shader generates tessellation factors and the tessellator subdivides (or tessellates) the primitives based on the tessellation factors to generate multiple higher resolution primitives. Tessellation factors for the patches launched by the hull shader circuit are held in a buffer that provides the primitives to the domain shader. Throttling circuitry uses the tessellation factors to estimate a time interval required by the domain shader to launch all the primitives from the domain shader, e.g., the number of cycles required to process the higher resolution primitives in the domain shader. This time interval is referred to herein as the "primitive launch time interval." Some embodiments of the throttling circuitry include a bank of registers that store information indicating a number of high resolution primitives (or cycles required to process the high resolution primitives) for the waves associated with corresponding entries in the buffer. The stored information is used to set a value of a counter that represents the primitive launch time interval for the domain shader. For example, a total counter is incremented by the number of cycles estimated to process high resolution primitives in the register associated with the buffer entry that is written to the tessellator for processing. The total counter is decremented iteratively (by the estimated primitive processing rate of the domain shader launch logic) in response to the domain shader launch logic completing processing of the higher resolution primitives associated with the patch. In some embodiments, an error counter is used to modify the total counter based on measurements of actual time required to process the primitives in the domain shader prior to launch from the domain shader. The value of the error counter is increased in response to a measured latency being larger than the latency corresponding to the value of the total counter, e.g., due to back pressure on the domain shader. The value of the error counter is decreased (or set to zero) in response to the measured processing time being less than or equal to the value of the total counter. The combined total counter and error counter are then decremented based on the tessellation factors of completed patches. Waves are selectively launched from the hull shader based on the value of the total counter and, if present, the error counter.

FIG. 1 is a block diagram of a processing system 100 according to some embodiments. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a graphics processing unit (GPU) 115, in accordance with some embodiments. The graphics processing unit (GPU) 115 renders images for presentation on a display 120. For example, the GPU 115 renders objects to produce values of pixels that are provided to the display 120, which uses the pixel values to display an image that represents the rendered objects. The GPU 115 implements a plurality of compute units (CU) 121, 122, 123 (collectively referred to herein as "the compute units 121-123") that execute instructions concurrently or in parallel. In some embodiments, the compute units 121-123 include one or more single-instruction-multiple-data (SIMD) units and the compute units 121-123 are aggregated into workgroup processors, shader arrays, shader engines, and the like. The number of compute units 121-123 implemented in the GPU 115 is a matter of design choice and some embodiments of the GPU 115 include more or fewer compute units than shown in FIG. 1. The compute units 121-123 can be used to implement a graphics pipeline, as discussed herein. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

The processing system 100 implements pipeline circuitry for executing instructions in multiple stages of the pipeline. The pipeline circuitry is implemented in some embodiments of the compute units 121-123 or the processor cores 131-133. In some embodiments, the pipeline circuitry is used to implement a graphics pipeline that executes shaders of different types including, but not limited to, vertex shaders, hull shaders, domain shaders, geometry shaders, and pixel shaders. Some embodiments of the processing system 100 include hull shader circuitry that launches thread groups including one or more primitives. For example, the compute units 121-123 in the GPU 115 can be used to implement the hull shader circuitry, as well as circuitry for other shaders and throttling of wave launches, as discussed herein. The hull shader circuitry also generates tessellation factors that indicate subdivisions of the primitives. Throttling circuitry in the processing system 100 estimates a primitive launch time interval for a domain shader based on the tessellation factors and selectively throttles launching of the thread groups from the hull shader circuitry based on the latency of the domain shader and a hull shader latency. In some cases, the throttling circuitry includes a first counter that is incremented in response to launching a thread group from the buffer and a second counter that modifies the first counter based on a measured latency of the domain shader.

Figure 2:
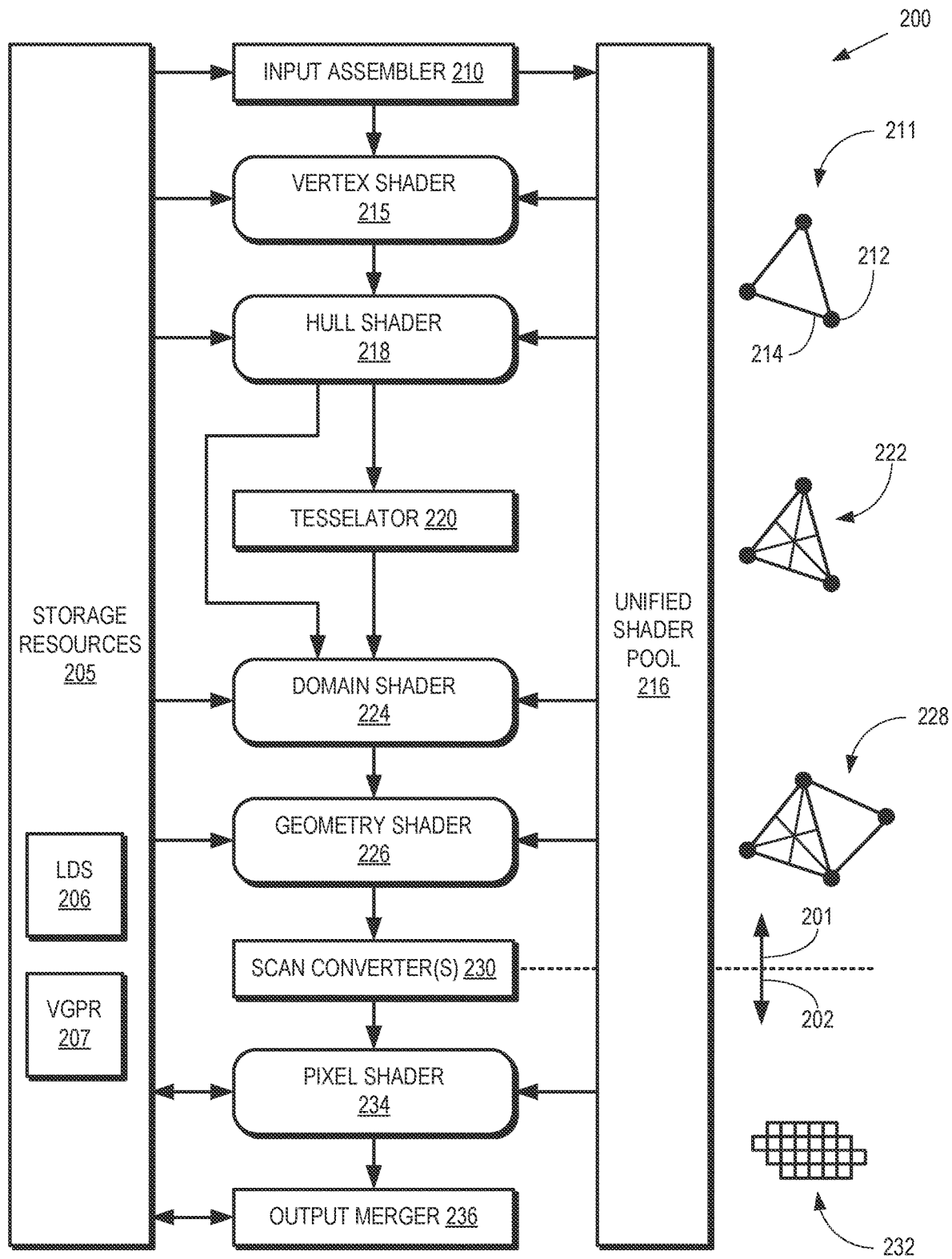
FIG. 2 depicts a graphics pipeline that is capable of processing high-order geometry primitives to generate rasterized images of three-dimensional (3D) scenes at a predetermined resolution according to some embodiments.

FIG. 2 depicts a graphics pipeline 200 that is capable of processing high-order geometry primitives to generate rasterized images of three-dimensional (3D) scenes at a predetermined resolution according to some embodiments. The graphics pipeline 200 is implemented in some embodiments of the processing system 100 shown in FIG. 1. The illustrated embodiment of the graphics pipeline 200 is implemented in accordance with the DX11 specification. Other embodiments of the graphics pipeline 200 are implemented in accordance with other application programming interfaces (APIs) such as Vulkan, Metal, DX12, and the like. The graphics pipeline 200 is subdivided into a geometry processing portion 201 that includes portions of the graphics pipeline 200 prior to rasterization and a pixel processing portion 202 that includes portions of the graphics pipeline 200 after rasterization.

The graphics pipeline 200 has access to storage resources 205 such as a hierarchy of one or more memories or caches that are used to implement buffers and store vertex data, texture data, and the like. In the illustrated embodiment, the storage resources 205 include load data store (LDS) 206 circuitry that is used to store data and vector general-purpose registers (VGPRs) to store register values used during rendering by the graphics pipeline 200. The storage resources 205 are implemented using some embodiments of the system memory 105 shown in FIG. 1.

An input assembler 210 accesses information from the storage resources 205 that is used to define objects that represent portions of a model of a scene. An example of a primitive is shown in FIG. 2 as a triangle 211, although other types of primitives are processed in some embodiments of the graphics pipeline 200. The triangle 203 includes one or more vertices 212 that are connected by one or more edges 214 (only one of each shown in FIG. 2 in the interest of clarity). The vertices 212 are shaded during the geometry processing portion 201 of the graphics pipeline 200.

A vertex shader 215, which is implemented in software in the illustrated embodiment, logically receives a single vertex 212 of a primitive as input and outputs a single vertex. Some embodiments of shaders such as the vertex shader 215 implement massive single-instruction-multiple-data (SIMD) processing so that multiple vertices are processed concurrently. The graphics pipeline 200 implements a unified shader model so that all the shaders included in the graphics pipeline 200 have the same execution platform on the shared massive SIMD compute units. The shaders, including the vertex shader 215, are therefore implemented using a common set of resources that is referred to herein as the unified shader pool 216.

A hull shader 218 operates on input high-order patches or control points that are used to define the input patches. The hull shader 218 outputs tessellation factors and other patch data such as control points of the patches that are processed in the hull shader 218. The tessellation factors are stored in the storage resources 205 so they can be accessed by other entities in the graphics pipeline 200. In some embodiments, primitives generated by the hull shader 218 are provided to a tessellator 220. The tessellator 220 receives objects (such as patches) from the hull shader 218 and generates information identifying primitives corresponding to the input object, e.g., by tessellating the input objects based on tessellation factors generated by the hull shader 218. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive.

A domain shader 224 inputs a domain location and (optionally) other patch data. The domain shader 224 operates on the provided information and generates a single vertex for output based on the input domain location and other information. In the illustrated embodiment, the domain shader 224 generates primitives 222 based on the triangles 211 and the tessellation factors. The domain shader 224 launches the primitives 222 in response to completing processing. A geometry shader 226 receives input primitives from the domain shader 224 and outputs up to four primitives (per input primitive) that are generated by the geometry shader 226 based on the input primitive. In the illustrated embodiment, the geometry shader 226 generates the output primitives 228 based on the tessellated primitive 222.

One stream of primitives is provided to one or more scan converters 230 and, in some embodiments, up to four streams of primitives are concatenated to buffers in the storage resources 205. The scan converters 230 perform shading operations and other operations such as clipping, perspective dividing, scissoring, and viewport selection, and the like. The scan converters 230 generate a set 232 of pixels that are subsequently processed in the pixel processing portion 202 of the graphics pipeline 200.

In the illustrated embodiment, a pixel shader 234 inputs a pixel flow (e.g., including the set 232 of pixels) and outputs zero or another pixel flow in response to the input pixel flow. An output merger block 236 performs blend, depth, stencil, or other operations on pixels received from the pixel shader 234.

Some or all the shaders in the graphics pipeline 200 perform texture mapping using texture data that is stored in the storage resources 205. For example, the pixel shader 234 can read texture data from the storage resources 205 and use the texture data to shade one or more pixels. The shaded pixels are then provided to a display for presentation to a user.

Figure 3:
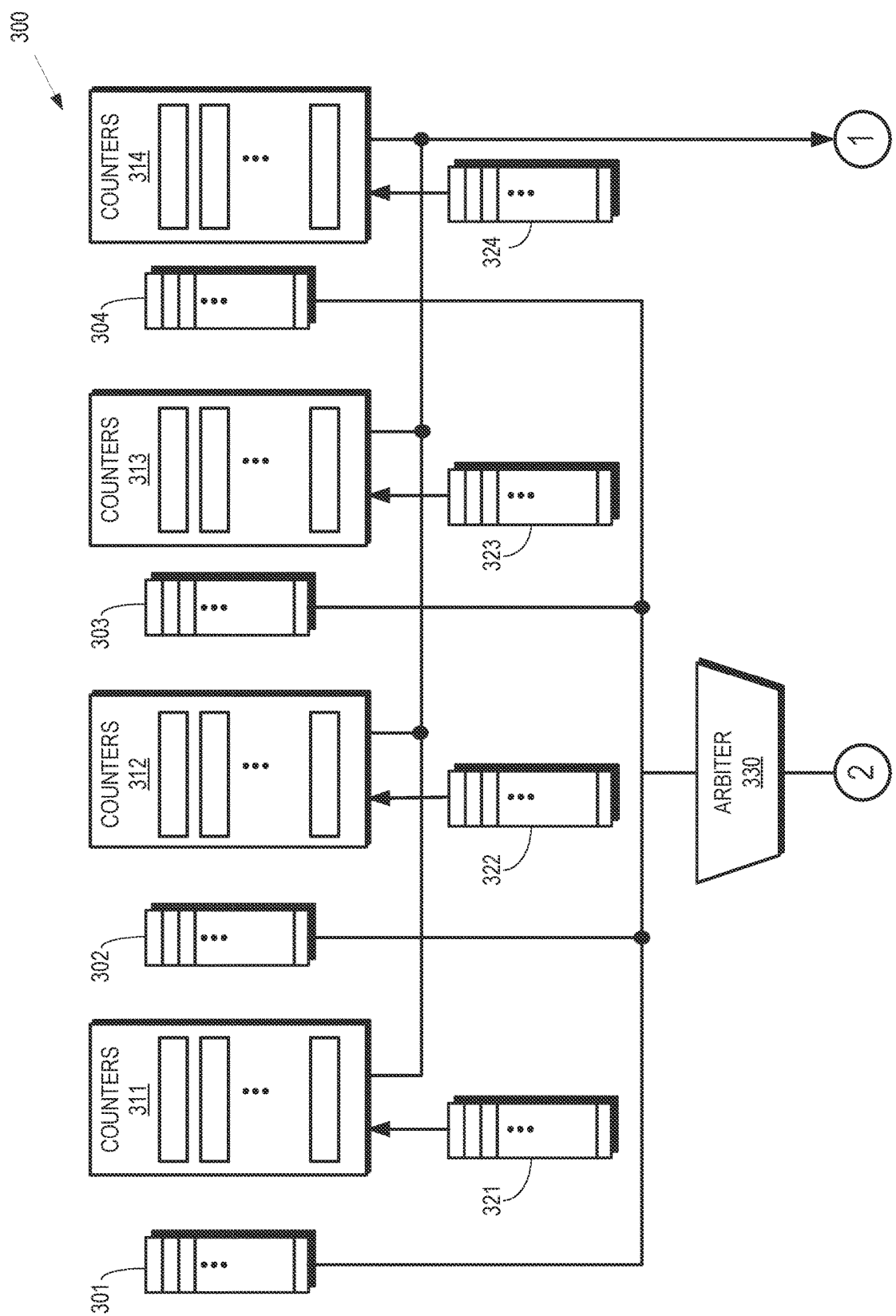
FIG. 3 is a block diagram of a first portion of a processing system that selectively throttles thread groups launched by hull shader circuitry according to some embodiments.

FIG. 3 is a block diagram of a first portion of a processing system 300 that selectively throttles thread groups launched by hull shader circuitry according to some embodiments. The first portion of the processing system 300 is implemented in some embodiments of the processing system 100 shown in FIG. 1 and the processing system 200 shown in FIG. 2.

A set of buffers 301, 302, 303, 304 (collectively referred to herein as "the buffers 301-304") are used to store metadata associated with thread groups launched by hull shader circuitry such as the hull shader 218 shown in FIG. 2. The buffers 301-304 are associated with different hull shader circuits (not shown in FIG. 3 in the interest of clarity) that launch thread groups including one or more waves of primitives such as patches. In response to launching a thread group for execution on a compute unit or SIMD, the hull shader circuitry provides metadata associated with the thread group to a corresponding one of the buffers 301-304. Each entry in the buffers 301-304 therefore includes metadata for a corresponding thread group.

The buffers 301-304 are associated with sets of counters 311, 312, 313, 314 (collectively referred to herein as "the counter sets 311-314") that have values representing measured time intervals or latencies for processing the corresponding thread groups in the hull shader. Each of the counters in the counter sets 311-314 is associated with an entry in a corresponding one of the buffers 301-304. For example, the first counter in the counter set 311 is associated with the first entry in the buffer 301. The counters begin to count (e.g., increment or decrement) when metadata is added to the corresponding entry in one of the buffers 301-304 in response to the hull shader circuitry launching a thread group.

Another set of buffers 321-324 has entries that store values that indicate that the corresponding thread group has completed processing. For example, an entry in the buffer 321 is written in response to a thread group launched by the corresponding hull shader circuitry completing execution on a compute unit. An entry in the buffer is used to stop counting by the corresponding counter in one of the counter sets 311-314. The counter therefore holds a value that represents the measured latency of the thread group, e.g., as a number of cycles used to process the thread group. Subsets of values of the counters in the counter sets 311-314 are provided to the second portion of the processing system 300 via the node 1, as discussed herein with regard to FIG. 4.

Figure 4:
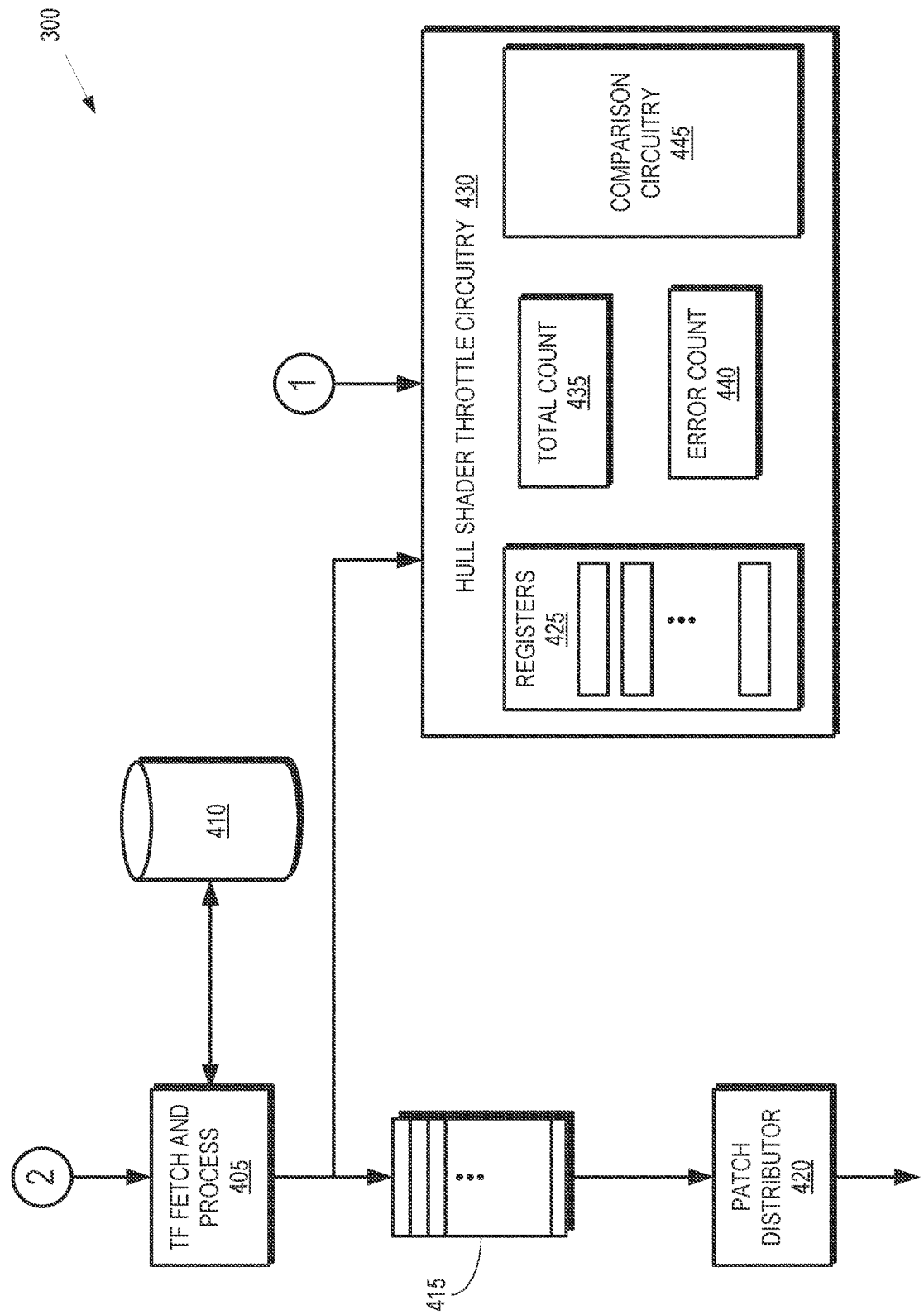
FIG. 4 is a block diagram of a second portion of the processing system that selectively throttles thread groups launched by hull shader circuitry according to some embodiments.

An arbiter 330 selects thread group metadata from the buffers 301-304 in the order that the thread groups are dispatched by the hull shader circuitry. For example, if a first thread group is dispatched by hull shader circuitry associated with the buffer 301 and a second thread group is subsequently dispatched by the hull shader circuitry associated with the buffer 302, the arbiter 330 selects the thread group metadata from the buffer 301 prior to selecting the thread group metadata from the buffer 302. The arbiter 330 provides the metadata associated with the thread group to circuitry that fetches tessellation factors for the thread groups via the node 2, as discussed herein with regard to FIG. 4 is a block diagram of a second portion of the processing system 300 that selectively throttles thread groups launched by hull shader circuitry according to some embodiments. The second portion of the processing system 300 is implemented in some embodiments of the processing system 100 shown in FIG. 1 and the graphics pipeline 200 shown in FIG. 2.

The second portion of the processing system 300 shown in FIG. 4 includes circuitry 405 that fetches tessellation factors from a memory 410 and performs processing on the tessellation factors and metadata received from the arbiter 330 shown in FIG. 3. Processing of the metadata received from the arbiter 430 includes parsing the received thread groups to identify the primitives (such as patches) included in the thread groups. The patches, tessellation factors, and associated metadata are then provided to a buffer 415. Each entry in the buffer 415 includes a patch and its associated tessellation factor(s) and metadata. Information in the entries of the buffer 415 are then provided to a patch distributor 420 that distributes the information to output buffers associated with one or more tessellators (such as the tessellator 220 shown in FIG. 2) and domain shaders (such as the domain shader 224 shown in FIG. 2).

The circuitry 405 also provides the tessellation factors for the primitives or patches in the thread group to registers 425 in hull shader throttle circuitry 430. Each register in the set of registers 425 stores an estimate of number of primitives (such as triangles) generated from the patch based on the values of the tessellation factors that are applied to the patches for a thread group in a corresponding entry of the buffer 415. The hull shader throttle circuitry 430 also includes two counters that are used to throttle the thread groups launched from the hull shader. A first counter 435 has a value of a total count that represents a primitive launched time interval for domain shader circuitry, e.g., the time interval used by the domain shader to process and launch a set of primitives associated with one or more primitives provided by a hull shader. The first counter 435 is incremented in response to providing a patch (and associated tessellation factors and metadata) from the buffer 415 to the patch distributor 420. In some embodiments, the first counter 435 is incremented by an amount indicated by a corresponding register in the set of the registers 425. For example, the first counter 435 can be incremented by a number of primitives or patches in the register corresponding to the patch provided from an entry in the buffer 415.

A second counter 440 in the hull shader throttle circuitry 430 has a value that represents an error count, which indicates a difference between a measured downstream latency for a patch (e.g., a time interval for processing a primitive by domain shader) and a predicted downstream primitive launch time interval indicated by the tessellation factors, e.g., by the number of primitives generated from a patch based on the tessellation factors. In some embodiments, the second counter 440 is incremented or decremented based on whether a read enable signal associated with the thread group arrives before or after the second counter 440 has counted down to a predetermined value such as zero. As discussed herein, the value in the second counter 440 is used to modify the first counter 435 based on a measured domain shader latency so that the value in the first counter 435 indicates the primitive launch time interval required by the domain shader for processing primitives after tessellation.

The hull shader throttling circuitry 430 determines a latency of the hull shader based on values of counters that indicate measured latencies of thread groups launched from the hull shader. The values of the counters are received (via the node 1) from registers associated with the shader engines that process the primitives in the hull shader, e.g., the values in the counters in the counter sets 311-314 shown in FIG. 3. In the illustrated embodiment, the values of the counters indicate latencies as a number of clock cycles required to process corresponding thread groups. Comparison circuitry 445 retrieves a predetermined number of counter values such as eight counter values for the last eight thread groups launched by the hull shader and uses the retrieved values to determine an average latency for the hull shader. The latency comparison circuitry 445 compares the average latency of the hull shader to the primitive launch time interval of the domain shader indicated by the total count in first counter 435. The hull shader throttle circuitry 430 then selectively throttles launching of thread groups from the hull shader circuitry based on the comparison, as discussed herein.

Figure 5:
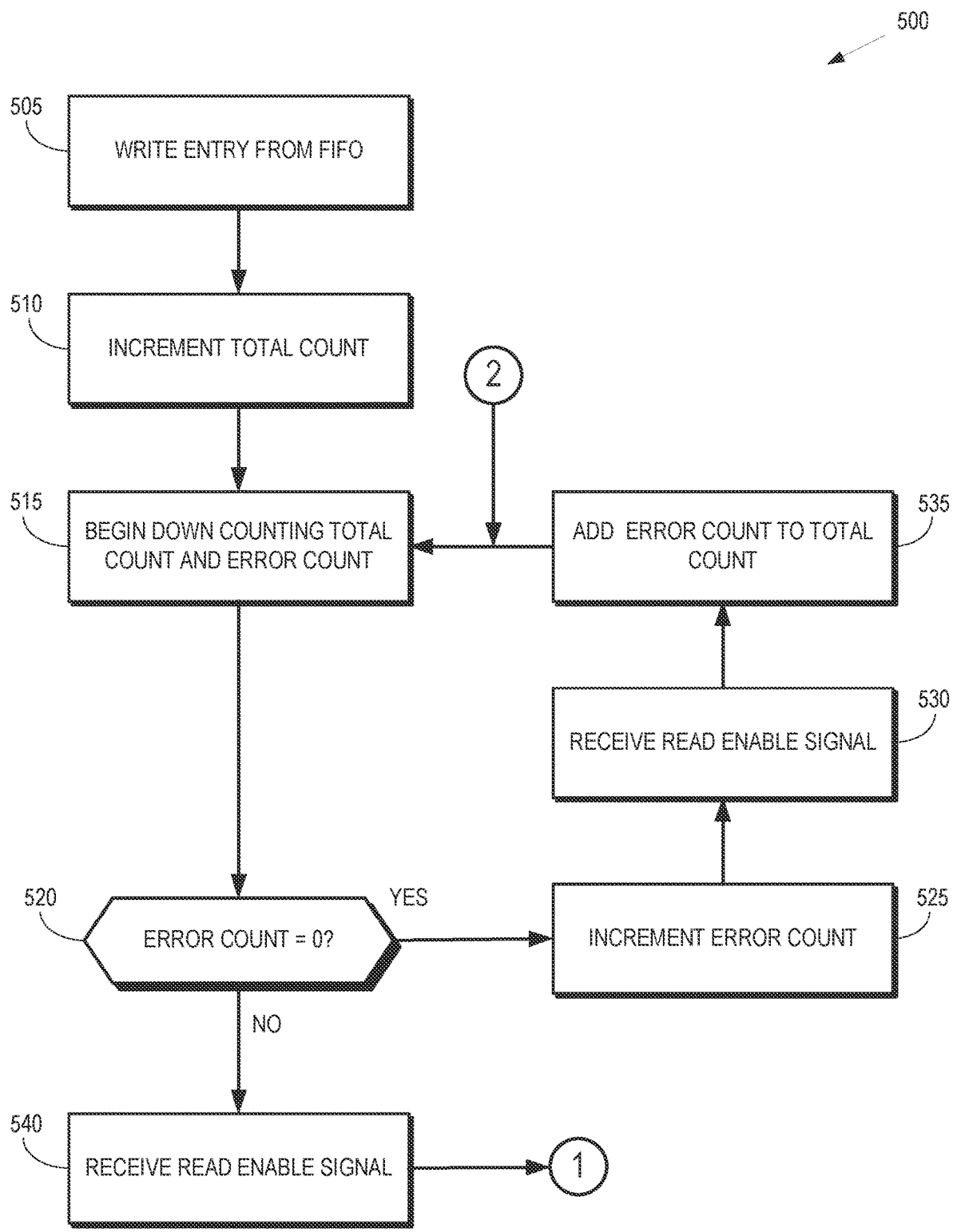
FIG. 5 is a flow diagram of a first portion of a method of estimating primitive launch time intervals for the domain shader using a total count and an error count according to some embodiments.

FIG. 5 is a flow diagram of a first portion of a method 500 of estimating primitive launch time intervals for the domain shader using a total count and an error count according to some embodiments. The method 500 is implemented in some embodiments of the processing system 100 shown in FIG. 1, the processing system 200 shown in FIG. 2, and the processing system 300 shown in FIGS. 3 and 4. In the illustrated embodiment, throttling circuitry is used to implement the method 500.

At block 505, the throttling circuitry intercepts write data for a thread group before it is written into a FIFO buffer such as the buffer 415 shown in FIG. 4. The throttling circuit uses this information to estimate the number of primitives being generated based on the tessellation factors (tf1, tf2) associated with the thread groups. For example, the number of primitives is equal to:

$2*inside\_tf1*inside\_tf2$ (for a quad patch)

$floor(1.5*inside\_tf1^2)$ (for a triangle)

$factor1*factor2$ (for an iso-line)

The number of primitives is then stored in a register that corresponds to the entry in the FIFO buffer that is used to store the thread group data, e.g., one of the registers 425 shown in FIG. 4.

At block 510, a first counter that indicates a total count is incremented by the number of primitives in response to the corresponding thread group being written. On the first read operation, a second counter that indicates an error count is loaded with a value equal to the number of primitives of the current location in the buffer.

At block 515, down counting (or decrementing) begins for the first counter (total count) and the second counter (error count). In some embodiments, the first and second counters down count by a product of the primitive rate of the tessellator and the number of the tessellator.

At decision block 520, the throttling circuitry determines whether the value of the second counter (error count) has reached zero prior to the throttling circuitry receiving a read enable signal. If not, the method 500 flows to the block 540. If the second counter reaches zero prior to reception of the read enable signal, which indicates that the primitive launch time interval for the domain shader has been underestimated, the method 500 flows to the block 525.

At block 525, the throttling circuitry increments the second counter (error count) on each clock cycle until the read enable signal is received. If the value of the second counter reaches a maximum value, the value of the second counter is clamped to the maximum value so that the second counter does not roll over. At block 530, the throttling circuitry receives the read enable signal. At block 535, the throttling circuitry adds the value of the second counter to the current value of the first counter. The method 500 then flows to the block 515.

At block 540, the throttling circuitry receives the read enable signal prior to the value of the second counter reaching zero. The method 500 then flows to the node 1 which connects the block 540 to the decision block 605 in FIG. 6.

Figure 6:
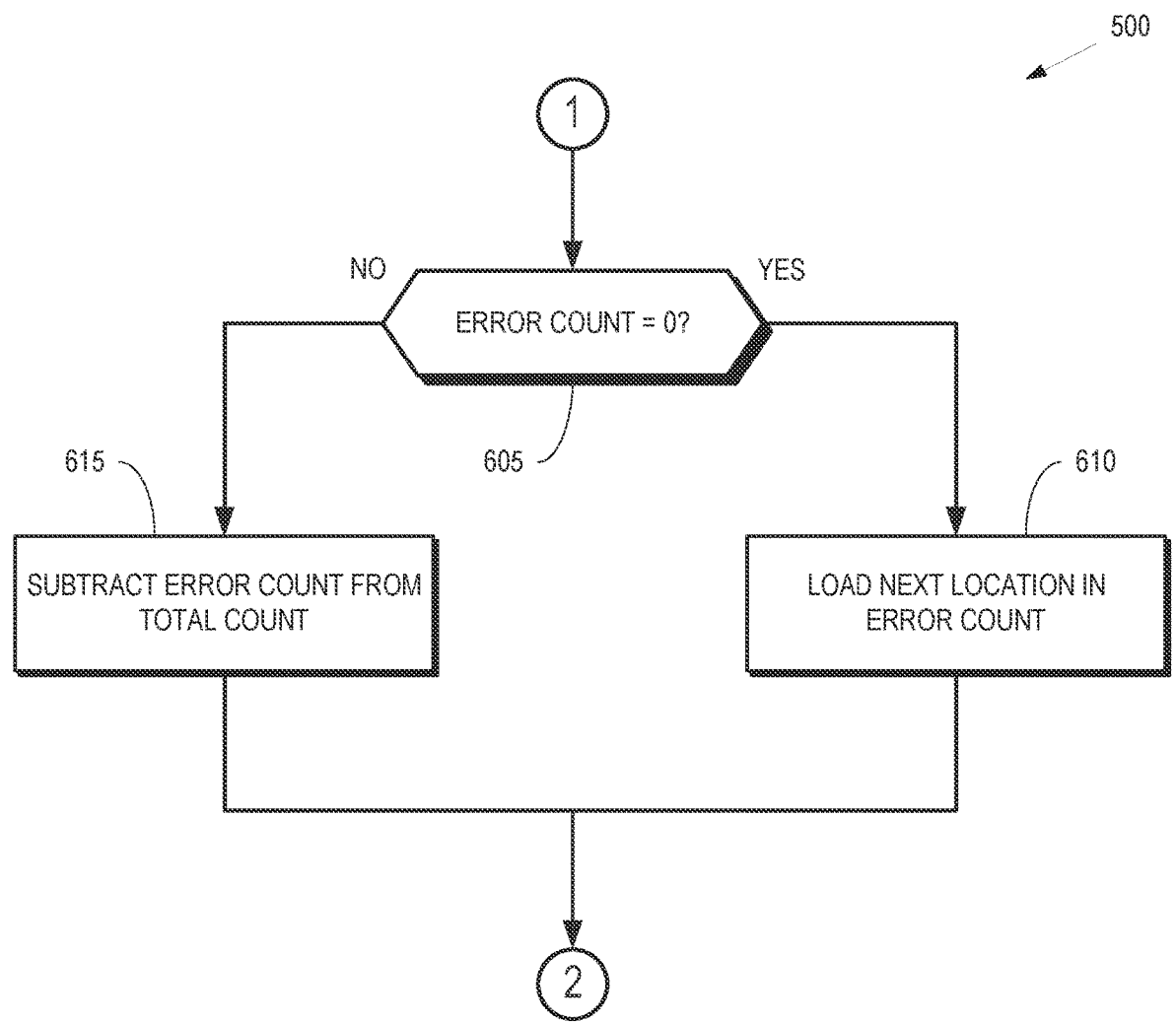
FIG. 6 is a flow diagram of a second portion of the method of estimating primitive launch time intervals for the domain shader using the total count and the error count according to some embodiments.

FIG. 6 is a flow diagram of a second portion of the method 500 of estimating primitive launch time intervals for the domain shader using the total count and the error count according to some embodiments. Decision block 605 is connected to the block 540 in FIG. 5 via the node 1.

At decision block 605, the throttling circuitry determines whether the error count is equal to zero when the read enable signal is received. If so, the method 500 flows to the block 610 and the next location is loaded into the second counter. The method 500 then flows to the block 515 in FIG. 5 via the node 2.

If the error count is not equal to zero when the read enable signal is received, i.e., the value of the error count is greater than zero, the method 500 flows to the block 615. An error count that is greater than zero indicates that the primitive launch time interval for the domain shader has been overestimated. The throttling circuitry therefore subtracts the value in the second counter from the value in the first counter (total count) at block 615. The method 500 then flows to the block 515 in FIG. 5 via the node 2.

The first counter therefore has a value that indicates a number of cycles between writing a thread group and receiving a subsequent read enable signal. Thus, the total count in the first counter indicates the total domain shader time/latency required to process the primitives in the thread groups that are generated post-tessellation. The total count can therefore be used to compare the domain shader latency to the hull shader latency and selectively throttle the launch of waves from the hull shader to maintain a balance between the rate of thread group consumption in the hull shader and the domain shader.

Figure 7:
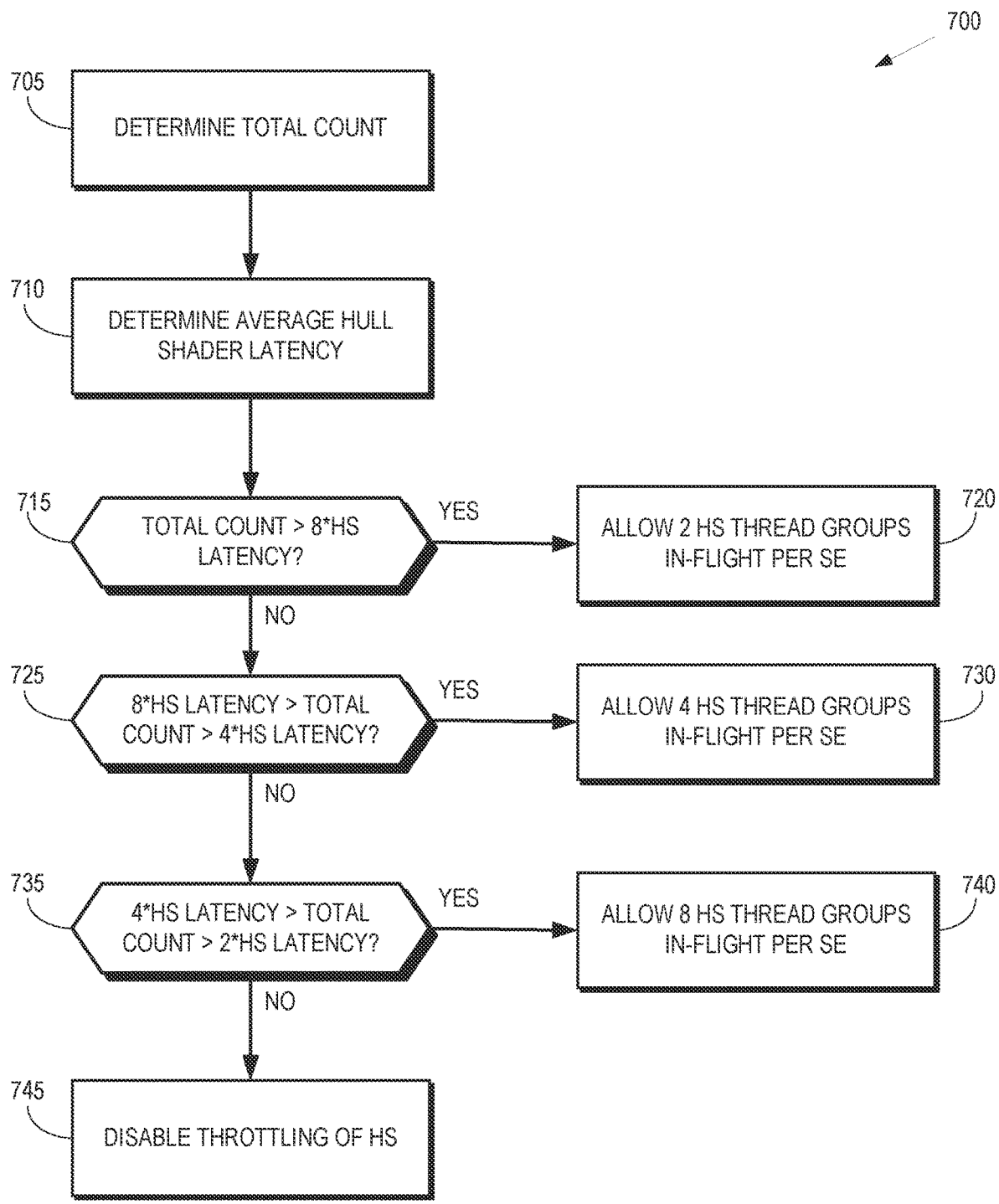
FIG. 7 is a flow diagram of a method of selectively throttling wave launches from a hull shader according to some embodiments.

FIG. 7 is a flow diagram of a method 700 of selectively throttling wave launches from a hull shader according to some embodiments. The method 700 is implemented in some embodiments of the processing system 100 shown in FIG. 1, the processing system 200 shown in FIG. 2, and the processing system 300 shown in FIGS. 3 and 4. In the illustrated embodiment, throttling circuitry is used to implement the method 500.

At block 705, the throttling circuitry determines a total count indicated by a first counter in the throttling circuitry, which indicates a primitive launch time interval for a domain shader. At block 710, the throttling circuitry determines an average hull shader latency, e.g., using values of counters associated with the thread groups processed by shader engines, as discussed herein.

At decision block 715, the throttling circuitry compares the total count and the hull shader latency and determines whether the total count is more than eight times greater than the hull shader latency. If so, the comparison indicates that the hull shader is running ahead of the domain shader and should be throttled. The method 700 therefore flows to block 720 and the hull shader is throttled to allow two in-flight thread groups per shader engine. If the total count is less than or equal to eight times the hull shader latency, the method 700 flows to the decision block 725.

At decision block 725, the throttling circuitry compares the total count and the hull shader latency and determines whether the total count is more than four times greater than the hull shader latency. If so, the comparison indicates that the hull shader is running ahead of the domain shader, although not as far ahead as the case where the total count is greater than eight times the hull shader latency. The hull shader should nevertheless be throttled. The method 700 therefore flows to block 730 and the hull shader is throttled to allow four in-flight thread groups per shader engine. If the total count is less than or equal to four times the hull shader latency, the method 700 flows to the decision block 735.

At decision block 735, the throttling circuitry compares the total count and the hull shader latency and determines whether the total count is more than two times greater than the hull shader latency. If so, the comparison indicates that the hull shader is running ahead of the domain shader, although not as far ahead as the case where the total count is greater than four times the hull shader latency. The hull shader should nevertheless be throttled. The method 700 therefore flows to block 740 and the hull shader is throttled to allow eight in-flight thread groups per shader engine. If the total count is less than or equal to two times the hull shader latency, the method 700 flows to the block 745 and throttling of the hull shader is disabled.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a processor configured to estimate a primitive launch time interval for a domain shader circuitry based on tessellation factors generated by a hull shader circuitry and throttle launching of thread groups from the hull shader circuitry based on the primitive launch time interval.

2. The apparatus of claim 1, further comprising the hull shader circuitry, the hull shader circuitry configured to launch thread groups comprising one or more primitives and generate the tessellation factors to indicate subdivisions of the one or more primitives.

3. The apparatus of claim 2, further comprising a tessellator configured to subdivide the one or more primitives into higher resolution primitives based on the tessellation factors.

4. The apparatus of claim 3, wherein the processor is configured to estimate a number of cycles to process the higher resolution primitives at the domain shader circuitry based on the tessellation factors and estimate the primitive launch time interval based on the number of cycles.

5. The apparatus of claim 4, further comprising:
a buffer comprising entries configured to store the thread groups launched by the hull shader circuitry; and
a set of registers corresponding to the entries in the buffer, wherein the set of registers stores information indicating the primitive launch time interval estimated for the thread groups in the entries.

6. The apparatus of claim 5, wherein each register in the set of the registers is configured to store information indicating at least one of a number of the higher resolution primitives in the thread group associated with the register and a number of cycles required to process the higher resolution primitives in the thread group associated with the register.

7. The apparatus of claim 6, further comprising:
a first counter that is incremented in response to launching a thread group from the buffer, wherein the first counter is incremented by an amount indicated by a corresponding one of the set of registers; and
a second counter that is configured to modify the first counter based on a measured latency of the domain shader circuitry.

8. The apparatus of claim 7, wherein the first counter indicates the primitive launch time interval for the domain shader circuitry to process primitives after the subdividing of the one or more primitives into higher resolution primitives based on the tessellation factors.

9. The apparatus of claim 8, wherein the second counter is incremented or decremented based on whether a read enable signal associated with the thread group arrives before or after the second counter has counted down to zero.

10. The apparatus of claim 1, wherein the processor is configured to throttle launching of the thread groups from the hull shader circuitry based on a latency of the hull shader circuitry.

11. The apparatus of claim 10, wherein the processor is configured to determine the latency of circuitry based on values of counters that indicate numbers of primitives in the thread groups launched from the hull shader circuitry.

12. The apparatus of claim 11, wherein the processor is configured to determine a number of thread groups launched by the hull shader circuitry based on a comparison of the primitive launch time interval for the domain shader circuitry and the latency of the hull shader circuitry.

13. A method comprising:
estimating a primitive launch time interval for a domain shader circuitry based on thread groups comprising one or more primitives and tessellation factors generated by a hull shader circuitry; and
throttling launching of subsequent thread groups from the hull shader circuitry based on the primitive launch time interval.

14. The method of claim 13, further comprising subdividing the one or more primitives into higher resolution primitives based on the tessellation factors.

15. The method of claim 14, further comprising:
estimating a number of cycles to process the higher resolution primitives at the domain shader circuitry based on the tessellation factors; and
estimating the primitive launch time interval based on the number of cycles.

16. The method of claim 15, further comprising:
storing, in entries of a buffer, thread groups launched by the hull shader circuitry; and
storing, in a set of registers corresponding to the entries in the buffer, information indicating the primitive launch time interval estimated for the thread groups in the entries in the buffer.

17. The method of claim 16, further comprising storing, in each register in the set of the registers, information indicating at least one of a number of the higher resolution primitives in a thread group associated with the register and a number of cycles required to process the higher resolution primitives in the thread group associated with the register.

18. The method of claim 13, wherein the throttling of the launching of subsequent thread groups from the hull shader circuitry is additionally based on a latency of the hull shader circuitry.

19. The method of claim 18, further comprising determining the latency of the hull shader circuitry based on values of counters that indicate numbers of primitives in thread groups launched from the hull shader circuitry.

20. An apparatus comprising:
a set of registers configured to store information, based on tessellation factors generated by a hull shader circuitry, indicating domain shader circuitry latencies estimated for thread groups launched by the hull shader circuitry and stored in a buffer;
a first counter that is incremented in response to launching a thread group from the buffer and has a total count value representative of a primitive launch time interval for a domain shader circuitry;
a second counter that has a value based on a measured domain shader circuitry latency, wherein the value of the second counter is used to modify the first counter; and
a comparison circuitry configured to throttle launching thread groups from the hull shader circuitry based on the primitive launch time interval.

* * * * *